United States Patent [19]
Stebe

[11] Patent Number: 5,103,566
[45] Date of Patent: Apr. 14, 1992

[54] RIP GUIDE FOR TOOLS

[76] Inventor: Thomas J. Stebe, 529 E. Pine Street, Long Beach, N.Y. 11561

[21] Appl. No.: 627,888

[22] Filed: Dec. 13, 1990

Related U.S. Application Data

[63] Continuation of Ser. No. 387,365, Jul. 26, 1989, abandoned, which is a continuation of Ser. No. 104,272, Oct. 5, 1987, abandoned.

[51] Int. Cl.$^5$ .......................... B43L 13/02; B43L 9/04
[52] U.S. Cl. ..................................... 33/42; 33/27.03; 30/326; 83/745
[58] Field of Search ...................... 33/42–44, 33/27.01, 27.03, 32.1, 32.2, 41.1, 41.5, 630, 631, 18.1, 26; 30/373, 375, 376, 388; 83/745, 767

[56] References Cited

U.S. PATENT DOCUMENTS

| | | | |
|---|---|---|---|
| 482,886 | 9/1892 | Weaver et al. | 33/458 |
| 508,453 | 11/1893 | Waldie | 33/631 |
| 663,168 | 12/1900 | Hembree | 33/27.03 |
| 922,580 | 5/1909 | Hansen | 33/458 |
| 1,004,173 | 9/1911 | Joss et al. | 33/43 |
| 1,005,992 | 10/1911 | McMurray | 33/27.03 |
| 1,007,038 | 10/1911 | Maupin | 33/44 |
| 1,792,393 | 2/1931 | Phillips | 33/42 |
| 1,877,185 | 9/1932 | Lowe | 33/42 |
| 2,603,873 | 7/1952 | Shaw | 33/42 |
| 2,943,392 | 7/1960 | Attridge | 33/27.01 X |
| 2,961,768 | 11/1960 | Krieder | 33/27.03 |
| 3,111,761 | 11/1963 | McAlister | 33/27.03 |
| 3,757,628 | 9/1973 | Camacho | 83/745 |
| 3,785,631 | 1/1974 | Prye | 33/32.2 |
| 4,128,940 | 12/1978 | Ong | 30/388 X |
| 4,324,514 | 4/1982 | Craven | 33/32.2 X |
| 4,483,071 | 11/1984 | Kolste | 33/42 X |

FOREIGN PATENT DOCUMENTS

| | | | |
|---|---|---|---|
| 514051 | 6/1955 | Canada | 30/373 |
| 552904 | 2/1958 | Canada | 30/373 |
| 3319060 | 11/1984 | Fed. Rep. of Germany | 33/630 |
| 201413 | 2/1966 | Sweden | 30/373 |

*Primary Examiner*—Harry N. Haroian
*Attorney, Agent, or Firm*—Morgan & Finnegan

[57] ABSTRACT

Rip guide for tools comprising a guide member adapted to slide along an edge of a work piece such as a sheet of plywood.

A slotted scale member having a guide end and a tool mounting end is adjustably mounted on the guide member.

A saw mounting member is rotatably mounted on the tool mounting end of the scale member. The tool mounting member is adapted to be clamped to a conventional tool.

The scale member has a transverse slot adjacent to its tool mounting end, the slot being adapted to receive a razor type knife for cutting plaster board parallel to the edge of the cutting piece.

The scale member also has at least one hole adjacent to its tool mounting end to receive a marking member for marking the work piece parallel to the edge of the work piece.

The scale member has a hole located a predetermined distance from the guide, the hole being adapted to receive a marker member for marking the work piece parallel to the edge of the work piece.

4 Claims, 10 Drawing Sheets

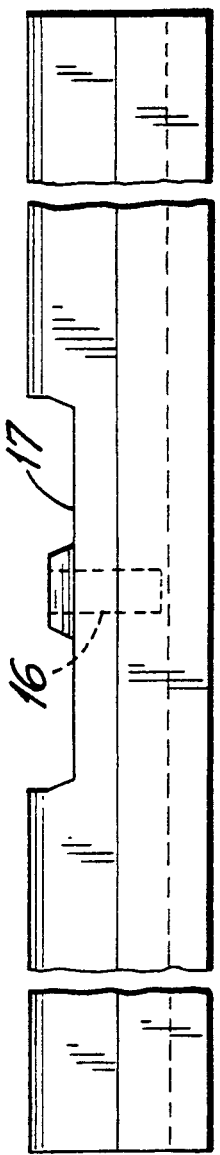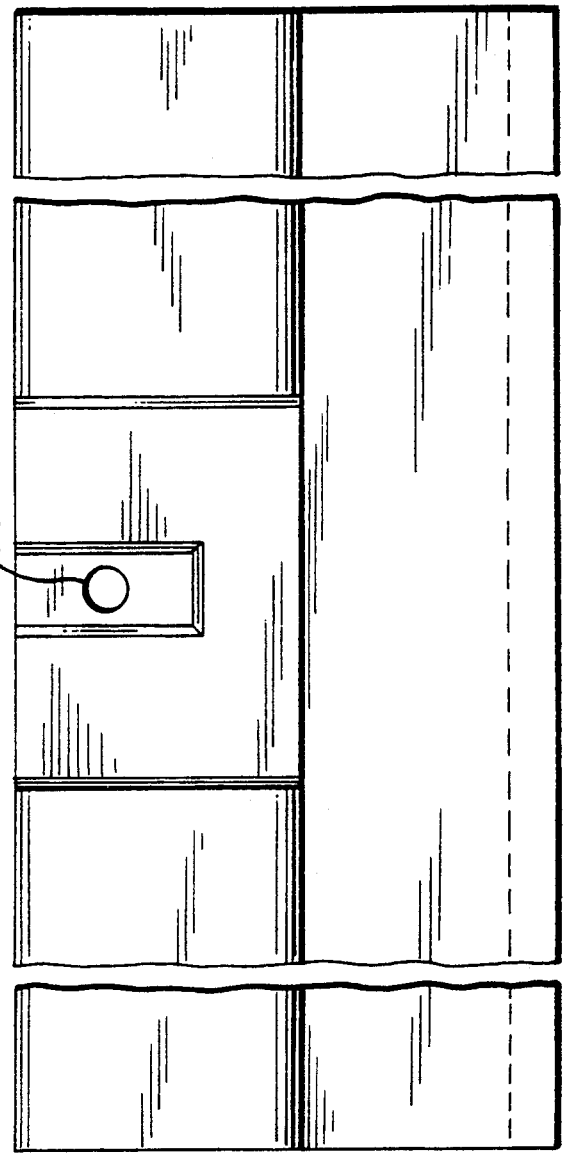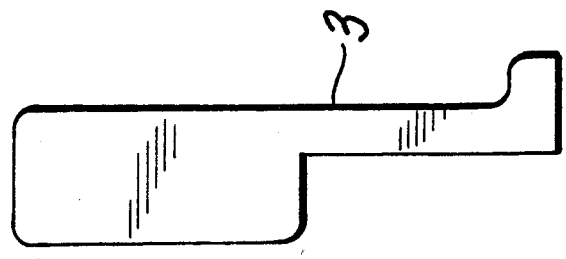

RIP GUIDE FOR TOOLS

This is a continuation of Ser. No. 07/387,365 filed July 26, 1989 now abandoned which is a continuation of co-pending application Ser. No. 07/104,272, filed on Oct. 5, 1987 now abandoned.

FIELD OF THE INVENTION

This invention relates to guides for tools and, more particularly, to such guides having means for rotatably mounting the tool so that the assembly of the guide and the tool may be laid safely on a flat surface when not in use.

BACKGROUND OF THE INVENTION

The following patents disclose previously known tool and cutting attachments:

| | |
|---|---|
| 1,881,295 | 4,016,649 |
| 3,286,351 | 4,414,745 |
| 3,927,475 | 4,483,071 |
| 4,129,940 | 4,324,514 |

However, these references do not show means for use of a razor knife to cut plaster board, or means to scribe pencil marks on the workpiece parallel to its edge or means for rotatably mounting the tool on the guide so that the tool may be rotated and the assembly laid down on a flat surface when not in use.

Rip guide for tools comprising a guide member adapted to slide along an edge of a work piece such as a sheet of plywood.

A slotted scale member having a guide end and a tool mounting end is adjustably mounted on the guide member.

A tool mounting member is rotatably mounted on the tool mounting end of the scale member. The tool mounting member is adapted to be clamped to a conventional tool.

The scale member has a transverse slot adjacent to its tool mounting end, the slot being adapted to receive a razor type knife for cutting plaster board parallel to the edge of the cutting piece.

The scale member has at least one hole adjacent to its tool mounting end to receive a marking member for marking the work piece parallel to the edge of the work piece.

The scale member has a hole located a predetermined distance from the guide, the hole being adapted to receive a marker member for marking the work piece parallel to the edge of the work piece.

Accordingly, the principal object of the invention is to provide new and improved rip guides for tools.

Another object of the invention is to provide a new and improved rip guide for tools incorporating a tool mounting member which is rotatably mounted.

Another object of the invention is to provide a new and improved rip guide for tools having means adapted to receive a razor type knife for cutting plaster board parallel to the edge of the work piece.

Another object of the invention is to provide new and improved rip guides for tools comprising a guide member adapted to slide along an edge of a work piece such as a sheet of plywood, a slotted scale member having a guide end and a tool mounting end, said scale member being adjustably mounted on said guide member, a tool mounting member rotatably mounted on the tool mounting end on said guide member.

A further object of the invention is to provide a unique, multi-use measuring tool offering precision, speed and versatility in a safe and lightweight design.

A main object of the invention is to provide easy attachability to various hand tools to cut, score or rip wood, plastics, metal, sheetrock, Wonderboard, paneling, etc.

These and other objects of the invention will be apparent from the following specifications and drawings of which

BRIEF DESCRIPTION OF THE DRAWINGS

FIGS. 5, 5A, 5B, show end, top and side views of the guide member.

DETAILED DESCRIPTION OF PREFERRED EMBODIMENT

Figure 1:
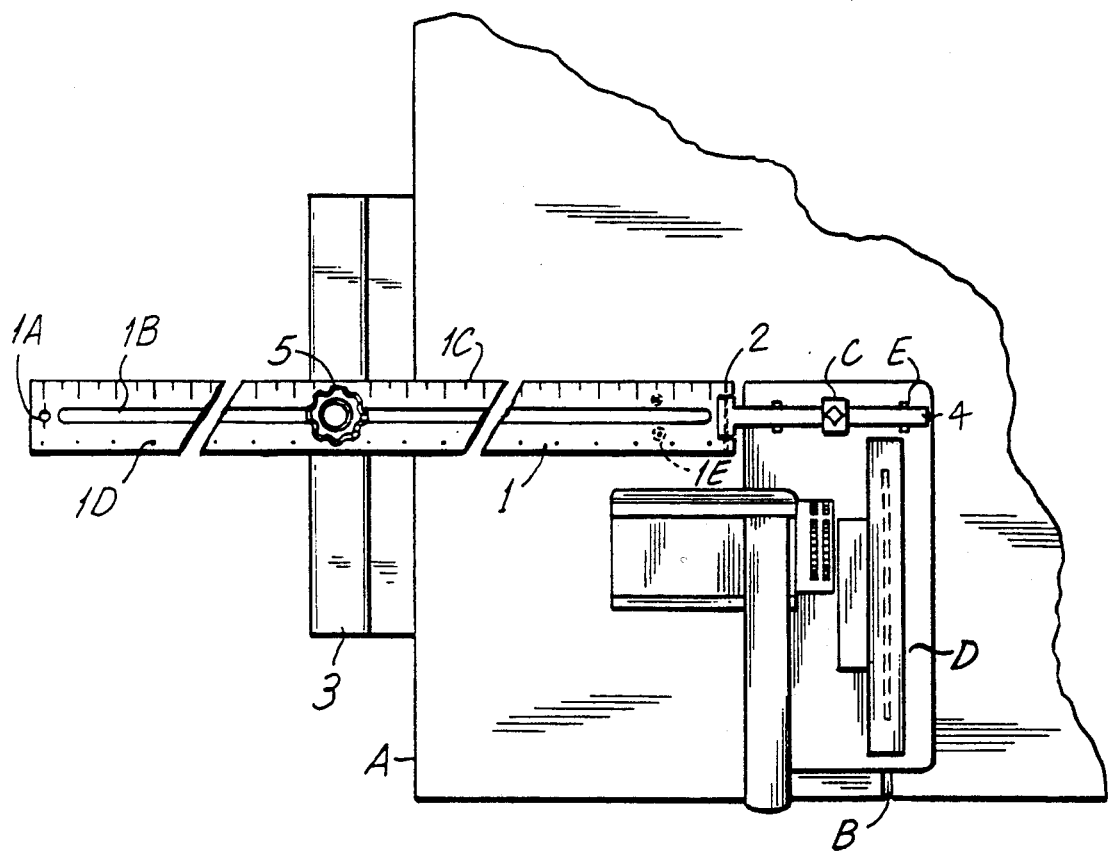
FIG. 1 is a plan view of an embodiment of the invention, showing a saw D mounted on the tool holding member or bracket 4.

FIG. 1 shows a top view of an embodiment of the invention mounted on a work piece A, which may be a piece of plywood. Scale member 1 is adjustably secured by clamp 5' to a guide member 3 which rides along an edge of the work piece A. At an end of the scale member 1 is a mounting member or 4 which is pivotally connected to the scale 1 by means of a pin 2.

The tool mounting member 4 is clamped to a power saw D in FIG. 1 by means of a clamp C. All conventional power saws have slides and guides E suitable for such mounting. The power saw D is conventional and consists of a blade member 15, a motor M and a handle 16.

In FIG. 1 the guide 3 has been set so that the saw D will make a cut in the plywood A. Therefore, by moving the assembly consisting of the guide member 3, the scale 1 and the saw D cut B may be extended indefinitely at the set distance from the edge of the plywood A.

Figure 2:
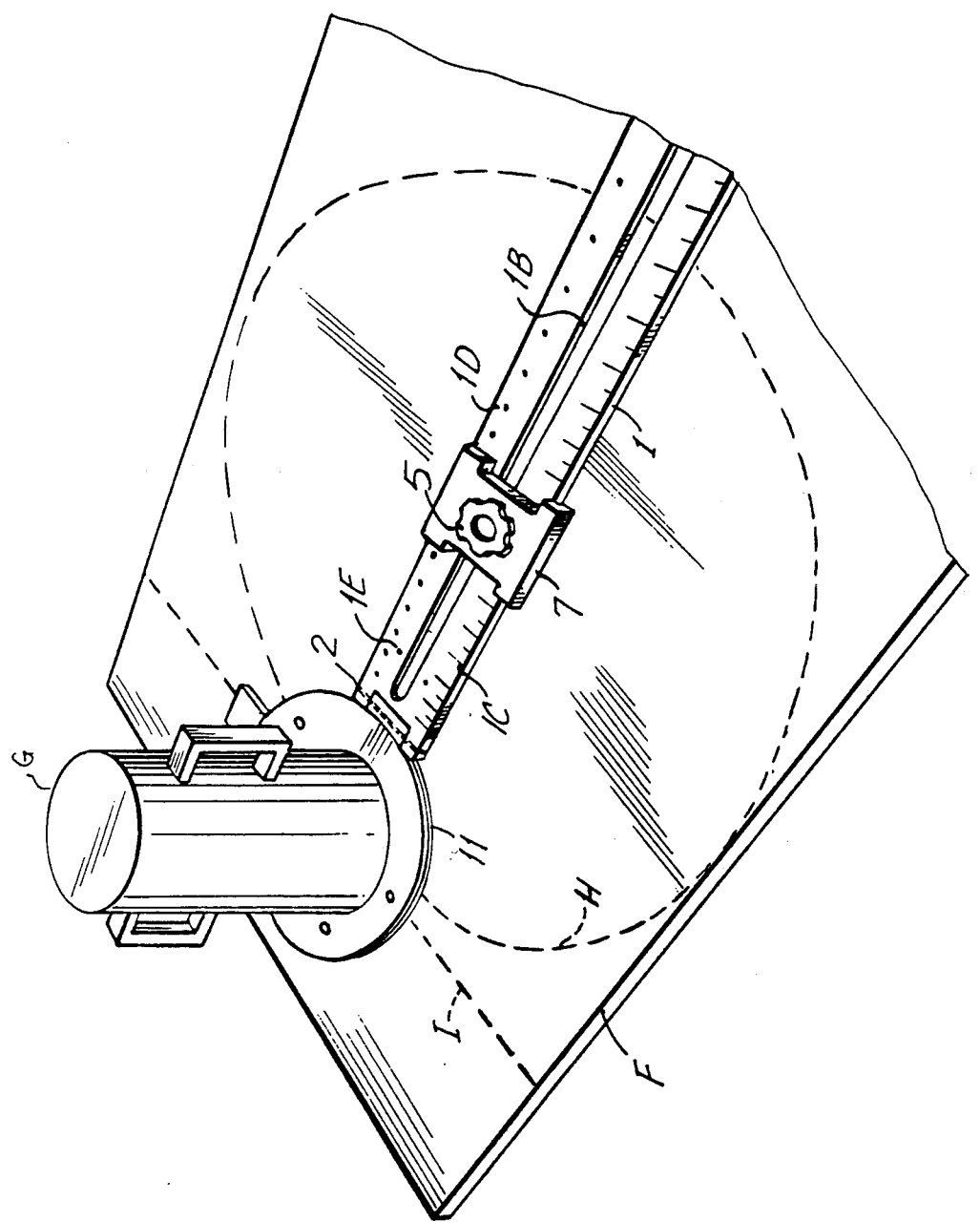
FIG. 2 is a perspective view of an embodiment of the invention showing a router G mounted for making circular cuts, for instance, table tops.

FIG. 2 shows a router G, mounted on a tool holding member 11 which is pivotally mounted on a scale 1 by means of pin 2'. The scale 1 is rotatably affixed to work piece F for the purpose of cutting circle H by means of clamps 5 and 7. The shaft of the clamp 5 has a sharpened point which is placed into the work piece F; for instance, a piece of plywood. The connection of mounting plate 11 with the pin 2' is substantially the same as the connection of the saw D in FIG. 1. The router G is affixed to the mounting plate 11 by means of bolts which will be more fully described in FIG. 11.

Figure 3:
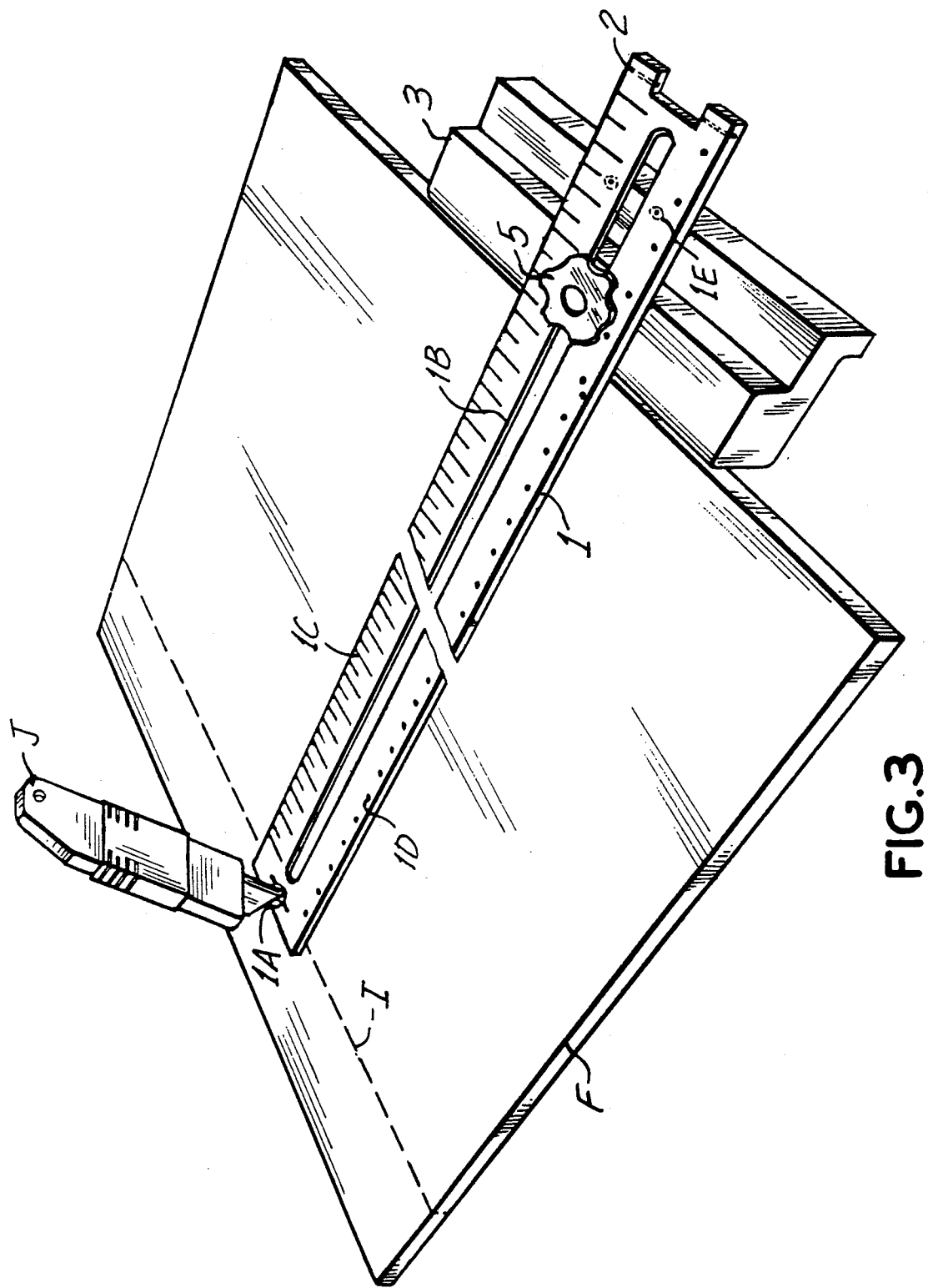
FIG. 3 is a perspective view showing the use of razor knife J.

FIG. 3 shows a perspective view of an embodiment of the invention which uses a razor or sheet-rock knife J to cut the work piece F, which may be a piece of plaster board. The knife J is held in the operator's hand and inserted through the slot 1a. The cut is made along line I, which is positioned by positioning the scale 1. Scale 1C may be used in making this measurement. The scale is clamped to the guide member 3 by means of the clamp 5, which extends through slot 1B. Dots 1D indicate another scale which is not shown.

Figure 4A:
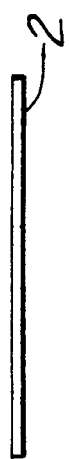
FIG. 4A is a side view of the hinge pin.
Figure 4:
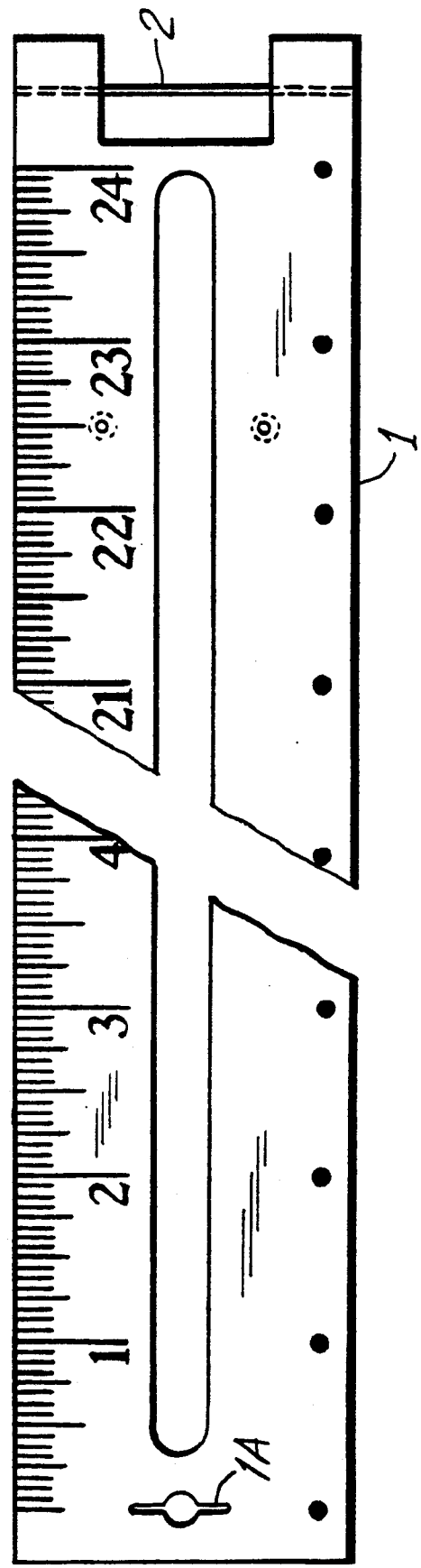
FIG. 4 is a top view of the scale member.

FIG. 4 shows a detailed view of the scale 1, having pin 2, and knife holding slot 1a. This aperture is made circular in the center for inserting a pencil or another scribe.

FIG. 4A shows the pin 2.

FIGS. 5A and 5B show the end, top and side views of the guide 3. The space 3' is to accommodate the operator's fingers while moving the guide. The top of the guide contains a threaded shaftway 16 and an aperture 17 wherein the scale is clamped.

Figure 6:
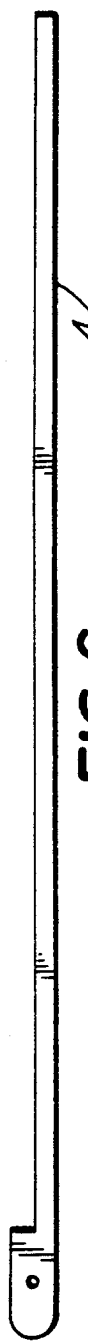
FIGS. 6, 6A, 6B, 6C, show top views of different saw mounting members or brackets.

FIG. 6 depicts a side view of a tool holding member.

Figure 6A:
Figure 6B:
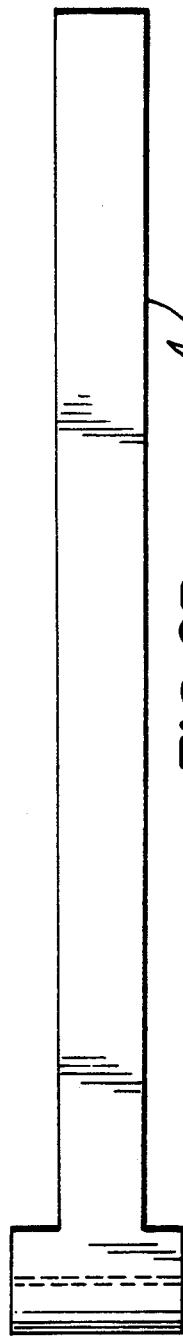
Figure 6C:
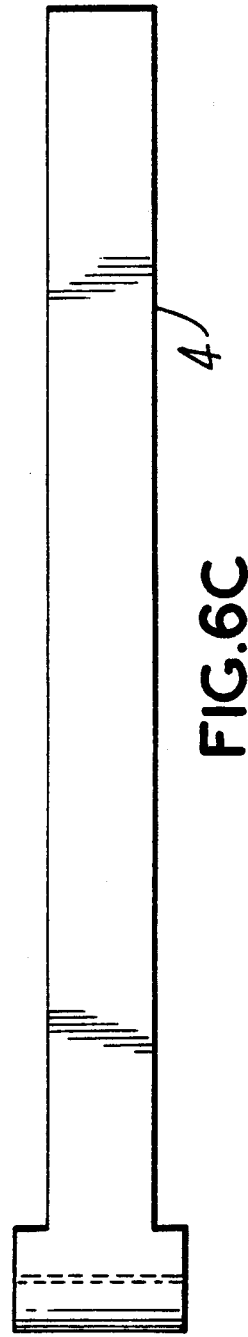

FIGS. 6A through 6C show various sized tool holding members—4A, 4B and 4C to accommodate different size tools which may be mounted on the end of the scale. Of course, marks may be placed on the guide member 3 to properly adjust the rip guide to different kinds or brands of tools secured to it.

Figure 7B:
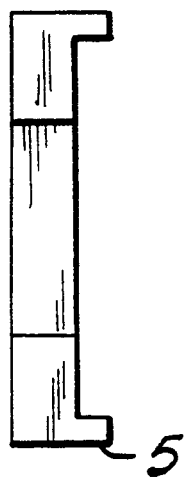
FIGS. 7, 7A, 7B, show side, top and end views of mounting clamp.
Figure 7A:
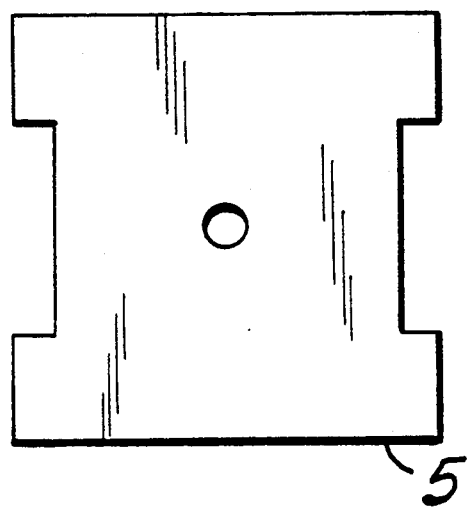
Figure 7:
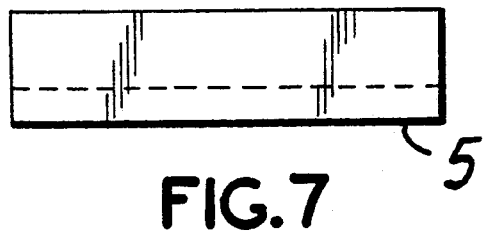

FIGS. 7, 7A and 7B show the mounting clamp 5, shown in FIG. 2.

Figure 8A:
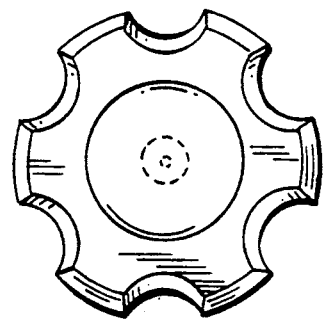
FIGS. 8, 8A, show side and top views of threaded mounting bar.
Figure 8:
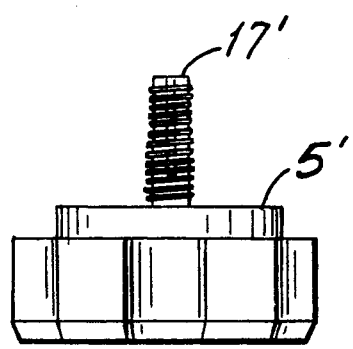

FIGS. 8 and 8A show the mounting clamp 5' shown in FIG. 1.

Figure 9:
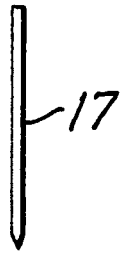
FIG. 9 shows a mounting pin for use in the bar of FIGS. 8, and 8A, side view.

FIG. 9 shows the pin 17, which is inserted in shaftway 17' in FIG. 8.

Figure 10:
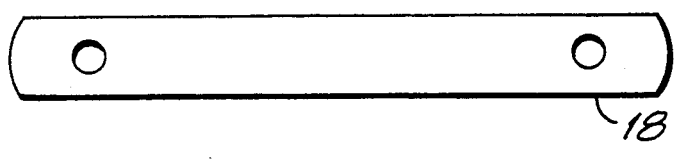
FIGS. 10, 10A, show a top and side view of mounting bracket.
Figure 10A:
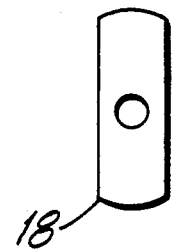
Figure 11:
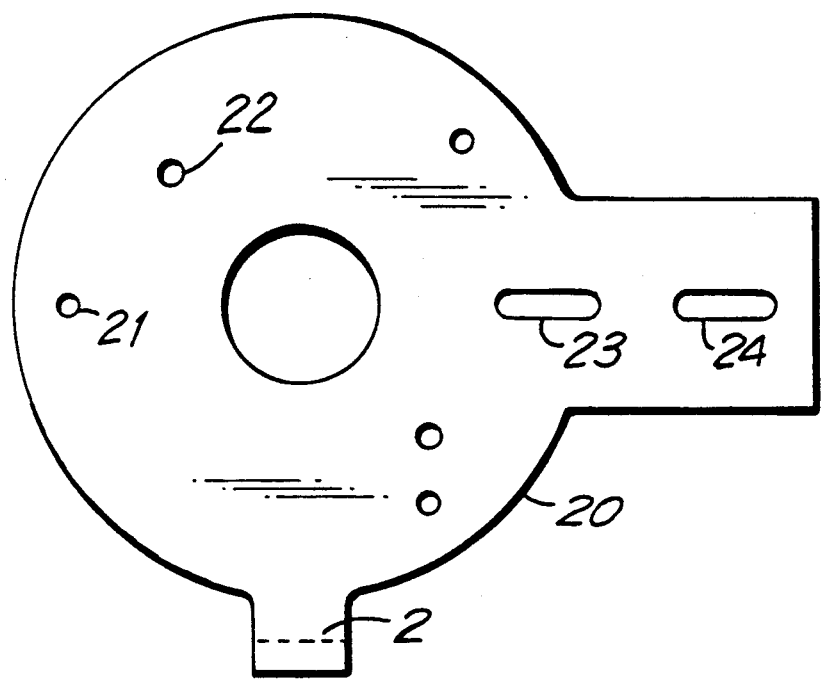
FIG. 11 shows mount member for router and drill press, top view.

FIGS. 10 and 10A show a threaded mounting guide 18 for a mounting clamp 5, shown in FIG. 8, which may be used to mount a jig saw on the mounting member shown in FIG. 11.

FIG. 11 shows a tool mounting member 10, which is pivotally mounted on the scale 1, by means of the pin 2. This member may be used for mounting a router by bolting through holes 20, 21, 22, etc. A jig saw may be mounted using the mounting bar 18 of FIG. 10, and bolting it to holes 23 and 24.

OPERATION

Referring to FIG. 1, and using a saw D as an example
mount saw on saw holding member or bracket 4,
adjust guide 3 to proper cutting width and clamp with knob 5,
make the saw cut, holding the saw in the right hand and the guide 3 in the left hand.

The saw mounting member 4 can be inserted from the other side of the saw and this will permit smaller cut distances.

Referring to FIG. 2, the router 6 is mounted on the member 11 which is pivotally attached to the scale 1, the router is mounted on the plate member 11 by means of conventional bolts with tapped holes in the router.

Referring to FIG. 3, the saw has been replaced by a razor knife J for cutting plaster board, the operation is otherwise the same as previously described for the saw.

The invention is a unique multi-use measuring tool, offering precision, speed and versatility to the homeowner and builder.

The invention attaches easily to all circular saws. Its easy-glide all purpose guide increases production. It can be used for wood, plastic, metal, sheet rock, wonderboard, paneling, etc.

The lightweight, safety design fits comfortably in the hand.

It scores, rips, cuts and cross-cuts accurately first time-everytime. No need for chalk lines.

It is easy-to-use.

While the preferred embodiments of the invention have been illustrated in detail, modifications and adaptations of such embodiments will be apparent to those skilled in the art. However, it is to be expressly understood that such modifications and adaptations are within the spirit and scope of the present invention as set forth in the following claims:

It is claimed:

1. A rip guide for tools, including:
   a guide member configured to slidably engage an edge of a generally stiff workpiece having a generally planar upper surface;
   a clamping member;
   a longitudinal scale member having a slot for slidably receiving said clamping member; said clamping member being configured for adjustably coupling said scale member to said guide member, said scale member lying essentially in the plane of the upper surface of said workpiece, said clamping member further including means for alternatively engaging a planar surface of said workpiece whereby a tool can be controllably moved relative to a point on said workpiece;
   a tool mounting member adapted for connection to a tool; and
   pivot means on said scale member at a site displaced from said guide member means, said pivot means being configured to releasably engage said tool mounting member, to permit rotation of said tool mounting member and said tool from a position above said workpiece into engagement with said workpiece, said rotation occurring about an axis parallel to said generally planar surface of said workpiece, said tool mounting member being configured and coupled to said pivot means such that said tool engages said workpiece in the plane containing said workpiece and said scale member.

2. The device of claim 1, wherein said pivot means includes a pin releasably installed therein.

3. The device of claim 1, wherein said pivot means is configured to engage any one of a plurality of different types of tool mounting members for mounting a plurality of different types of tools.

4. The device of claim 3, wherein one of said plurality of tools is a conventional circular saw.

* * * * *